United States Patent [19]
Grygera

[11] 3,825,768
[45] July 23, 1974

[54] PHASE SEQUENCE AND POWER LOSS DETECTOR

[75] Inventor: James W. Grygera, Racine, Wis.

[73] Assignee: Eaton Corporation, Cleveland, Ohio

[22] Filed: Feb. 15, 1973

[21] Appl. No.: 332,855

[52] U.S. Cl. ............................ 307/127, 317/27 R
[51] Int. Cl. ................................................ H02h 1/00
[58] Field of Search............. 307/127; 317/27 R, 47

[56] References Cited
UNITED STATES PATENTS
| | | | |
|---|---|---|---|
| 3,401,308 | 9/1968 | Darke | 317/27 R |
| 3,584,259 | 6/1971 | Troy et al. | 317/27 R |
| 3,681,636 | 8/1972 | Calfee | 307/127 |

*Primary Examiner*—Robert K. Schaefer
*Assistant Examiner*—M. Ginsburg
*Attorney, Agent, or Firm*—Teagno & Toddy

[57] ABSTRACT

A phase sequence and power loss detector is provided to sense incorrect phase sequence or loss of power from a poly-phase power line. To this end predetermined individual connections are provided for each phase signal of the poly-phase power line. The individual signals are conditioned by signal conditioning circuits and then directed to the phase sequence and power loss circuit. The phase sequence and power loss circuit produces a pulsating output signal when the individual signals of the poly-phase power signal have an incorrect phase relationship, or fail to provide power. A constant level output signal is produced by the phase sequence and power loss circuit when the individual signals of the poly-phase power signal have a predetermined phase relationship and provide power to their respective connections. The output of the phase sequence and power loss circuit is connected to a flip-flop circuit which converts the pulsating and constant level output signals of the phase sequence and power loss circuit to distinct first and second constant level output signals for operating an indicator.

13 Claims, 9 Drawing Figures

PHASE SEQUENCE AND POWER LOSS DETECTOR

BACKGROUND OF THE INVENTION

1. Field of the Invention

The present invention relates to signal sequence and power loss detectors generally and more particularly to detectors for sensing a predetermined phase sequence or power connection of individual phase signals of a polyphase power signal.

2. Description of the Prior Art

Poly-phase power control circuits, such as the circuits used in DC motor control, require a predetermined connection of the individual phases of a poly-phase power line for proper operation of the control circuit. Should the individual phase connections of the poly-phase power line occut in a non-predetermined manner or should power be lost in any of the individual phases of the poly-phase power line, an indication thereof is highly desirable to facilitate speedy trouble-shooting and prompt corrective action.

Devices are known for detecting power loss in an individual phase of a poly-phase power connection. These devices include time delay circuitry which requires the monitoring of the individual phase connections with the time delay allowing for the normal cyclic repetition of the individual power signals and the actuation of an indicating or control function once the normal time duration between the cycles of the individual phase signals is exceeded. Such time delay circuits involve the use of reactive circuit components such as capacitors which are charged and discharged at predetermined times.

Devices are also known for detecting a predetermined connection of individual phase signals of a poly-phase power line. These known detectors utilize reactive circuit elements such as inductors and capacitors. The reactive circuit elements are connected to the appropriate individual phase signals to perform compensating phase shifts on the predeterminately connected individual phase signals to place them in phase. A summing circuit is connected to the compensated signals which produces a first or second level output signal. The first level output signal is produced when the individual phase signals are connected in a non-predetermined manner. The second level output signal is produced when the individual phase signals are connected in a non-predetermined manner. The second level output is made possible by the non-predeterminately connected signals not being properly phase compensated and, therefore, producing a different level summation from that of properly phase compensated signals. Such devices require complex and expensive circuitry for producing the desired individual phase shifts. These prior art devices are expensive to operate because of the power losses produced by the reactive components of the detector circuitry.

SUMMARY OF THE INVENTION

The Applicant's invention solves all the above-named problems of the prior art devices as well as others by providing a novel phase sequence and power detector. The phase sequence and power detector includes predetermined first, second, and third phase power signal connections. The first and second phase power signal connections are connected to means responsive to the first and second power signals to produce a control signal indicative of the phase relationship between the two signals. The control signal is directed, along with the signal from the third phase power signal connection, to sensing means responsive to the control signal and the signal from the third phase power signal connection. The sensing means produces a pulsating output signal whenever the power signals have a non-predetermined phase sequence or if there is a power loss in any of the individual power signal connections. Whenever the power signals are connected in a predetermined phase sequence with power from each connection, a first constant level output signal is established by the sensing means.

An additional feature of the Applicant's invention enables the pulsating output signal from the sensing means to be connected to a converting means which converts the pulsating output signal, indicative of a non-predetermined phase sequence connection or a power loss, into a second constant level output signal. The second constant level output signal is distinct from the first constant level signal and is indicative of a predetermined phase sequence connection and power from each phase. These constant level distinct signals are capable of actuating an indicator which indicates the presence of a non-predetermined phase sequence between the power signal connections or a power loss in at least one of the power signal connections.

Accordingly, an object of the present invention is to provide a phase sequence and power detector which produces a first constant level output signal whenever the power signals are connected in a predetermined phase sequence with power from each connection and a pulsating output upon detecting a non-predetermined phase sequence connection or a power loss in any of the power signal connections.

Another object of the present invention is to provide a flip-flop circuit connected to a phase sequence and power detector which produces a first constant level output signal indicative of a predetermined phase sequence connection of the phase power signals and which produces a second contant level output signal distinct from the first constant level output signal upon detecting a non-predetermined phase sequence.

These and other objects of the Applicant's present invention will be more clearly understood from the drawings and the description of the preferred embodiment which follow.

DESCRIPTION OF THE PREFERRED EMBODIMENT

Figure 1:
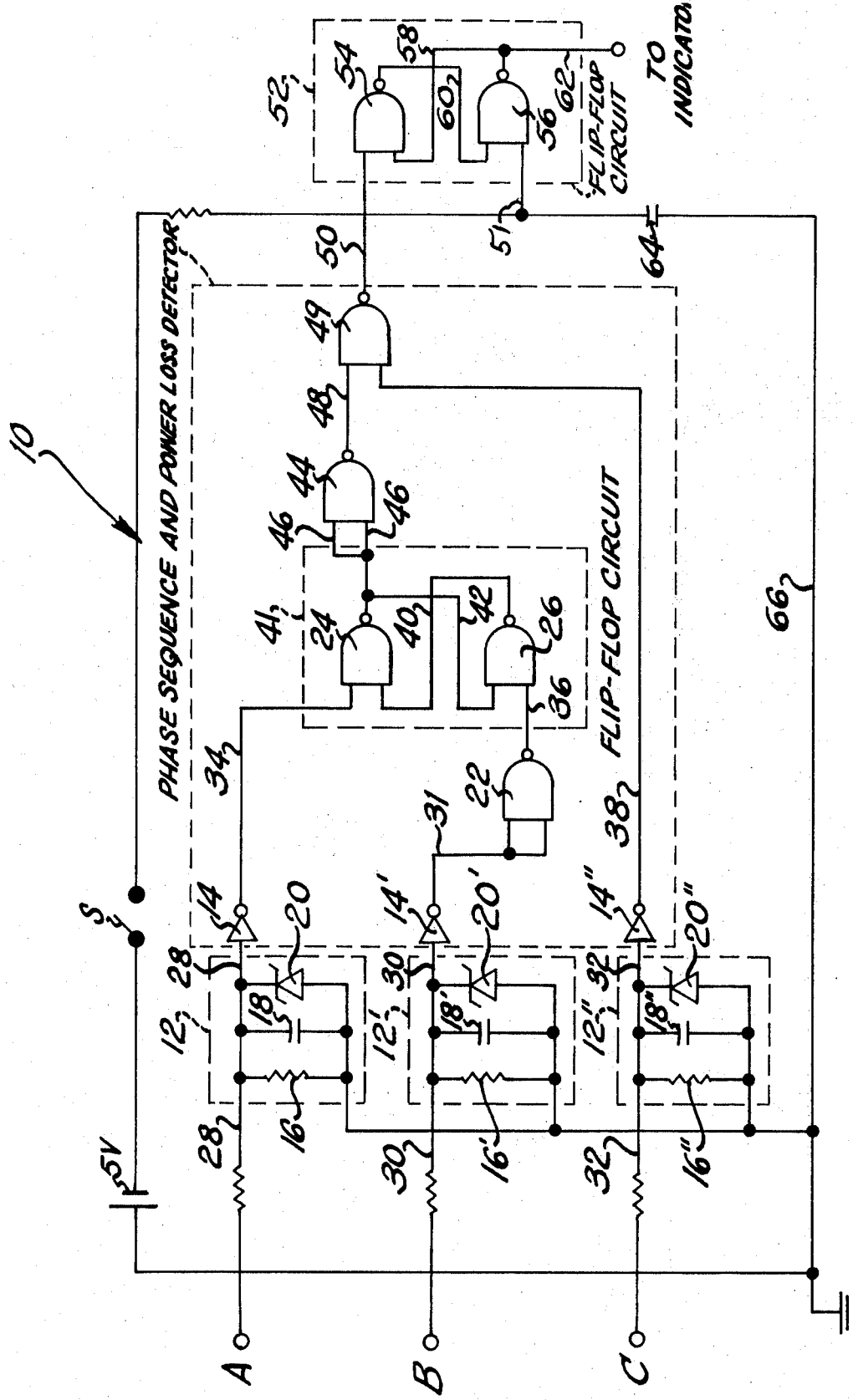
FIG. 1 is a schematic representation of the phase sequence and power loss detector circuitry.
Figure 2:
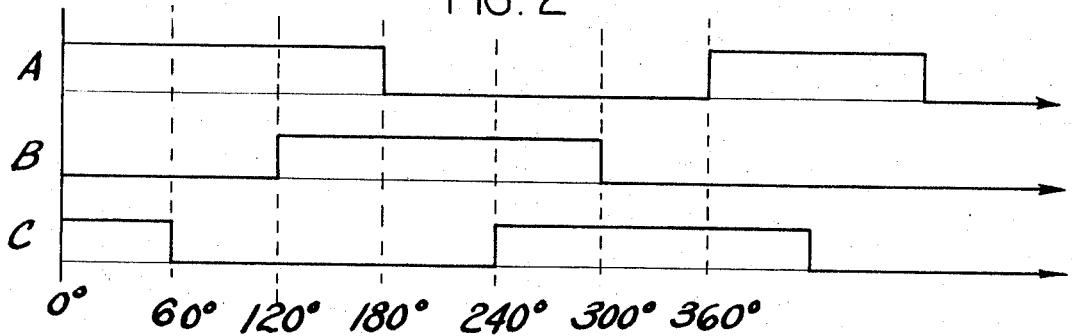
FIG. 2 shows the periodic variation and predetermined phase sequence of attenuated and rectified input signals A, B, and C from the poly-phase power line.

Referring to FIG. 1, circuitry is shown which includes a phase sequence and power loss detector circuit 10 for sensing incorrect phase sequence or loss of power from a poly-phase power line having a first, second and third phase power line. The individual phase power signals are attenuated, rectified, and converted to a cyclic square wave signal having a frequency dependent upon the poly-phase power line frequency by means familiar to those skilled in the art to produce first, second and third phase power signals A, B, and C as illustrated in FIG. 2.

The first, second and third phase power signals A, B, and C are connected to the phase sequence and power loss detector 10 through respective signal conditioning circuits 12, 12', and 12''. The signal conditioning circuits 12, 12' and 12'' attenuate and filter the individual power signals A, B, and C before the signals are applied to the phase sequence and power loss detector 10 along lines 28, 30 and 32, respectively. The conditioning circuits 12, 12', 12'' are identical and the following description of the circuit 12 is applicable to circuits 12' and 12''. The signal conditioning circuit 12 includes a resistor 16, a capacitor 18 and a zener diode 20 all parallel connected across the phase power signal A. The resistor 16 and capacitor 18 act to attenuate and filter the individual phase power signal. The zener diode 20 insures that a 5 volt logic level is directed from the signal conditioning circuit 12 to the phase sequence and power loss detector 10. Thus, the signal condition circuit 12 insures that the output therefrom is a positive constant 5 volt noise free signal when phase power signal A is positive.

The input lines 28, 30, and 32 are connected to phase sequence and power loss detector 10 through inverters 14, 14', and 14'', respectively. The inverters 14, 14', 14'' are utilized to invert the signals A, B, C and to produce a sharp leading edge to the respective input signal thereby making the signals compatible for use in the logic circuitry of the phase sequence and power loss detector 10. The detector 10 includes a NAND gate 22 connected to the inverter 14' by line 31. The NAND gate 22 acts to invert the second phase signal B from the inverter 14'. A flip-flop circuit 41 of the phase sequence and power loss circuit 10 is responsive to the first phase signal A, from the inverter 14, and the second phase signal B, from the NAND gate 22, to produce a single pulsating signal indicative of phase orientation between the first and second phase signals A, B.

The flip-flop circuit 41 includes a first NAND gate 24 and a second NAND gate 26. One input of the NAND gate 24 is connected to the output of the NAND gate 26 by line 40 and one input of the NAND gate 26 is connected to the output of the NAND gate 24 by line 42. The first phase power signal A is connected to another input of the first NAND gate 24 by line 34 connected to the inverter 14. The second phase input signal B is connected by line 31 from the inverter 14' to the NAND gate 22 which inverts the inverted signal carried by line 31 and transmits it to a second input of the second NAND gate 26 by line 36.

When the individual signals A, B, and C of a polyphase power supply are connected to the phase sequence and power loss detector 10 in a predetermined phase sequence, as shown in FIG. 2, the individual power signals A, B, C are 120 electrical degrees apart with the power signal B lagging power signal A by 120 electrical degrees and power signal C lagging power signal A by 240 electrical degrees.

For such predetermined phase sequence, the detector circuit 10 responds to the signals A, B, and C in the following manner.

The first phase input signal A is inputted into the first NAND gate 24 of the flip-flop circuit 41 in an inverted form due to the action of the inverter 14. The second phase input signal B is inputted into the second NAND gate 26 of the flip-flop circuit 41 in a non-inverted form due to the double inversion provided by the inverter 14' and the NAND gate 22. The flip-flop circuit 41 responds to the first and second phase signals A and B in a manner well known to those skilled in the art to provide a control output signal to lines 46 having a configuration indicated as FF OUTPUT in FIG. 3. This control signal indicative of predetermined phase sequence between signals A and B has a positive level signal from 0 to 300 electrical degrees and a zero level signal from 300 to 360 electrical degrees.

Figure 3:
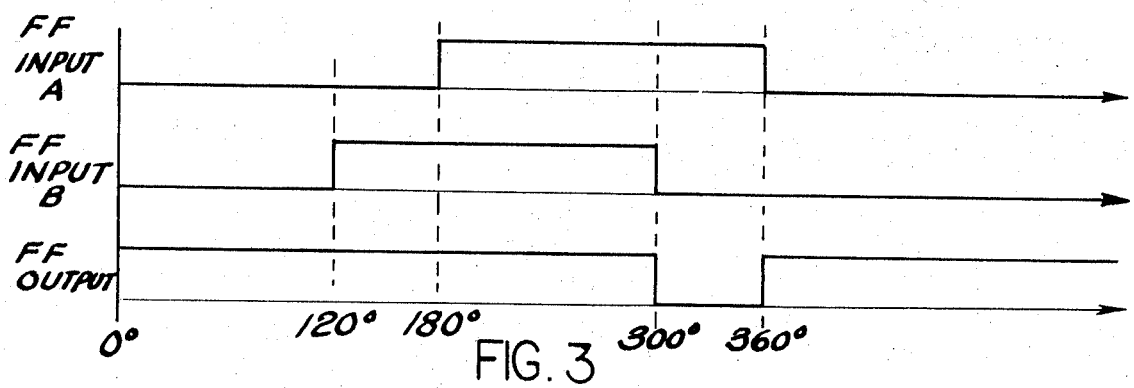
FIGS. 3 and 3a show the response of the phase sequence and power loss detector circuit to the phase signals A, B, and C connected in predetermined phase relationship.
Figure 3A:
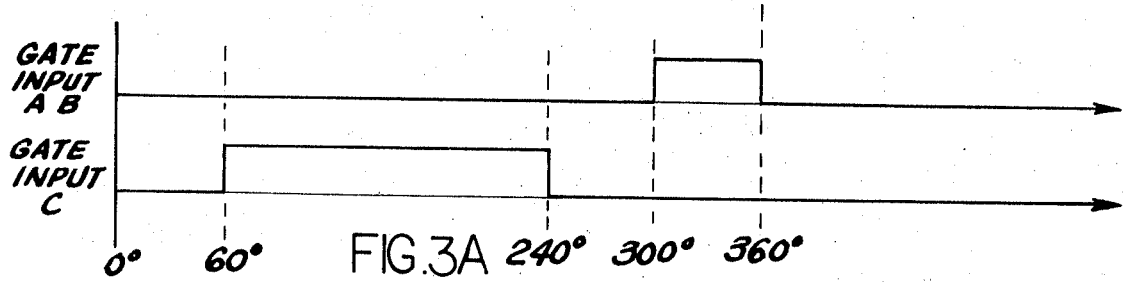

A NAND gate 49 is provided which is responsive to the control signal and the third phase input signals. To this end, the control signal, indicative of predetermined phase sequence between signals A, B, is inputted by lines 46 into the inputs of a NAND gate 44 which inverts the signal and conducts it by line 48 into one input of the NAND gate 49. The other input of the NAND gate 49 accepts the third phase input signal C, conducted from the inverter 14''. FIG. 3a exhibits the control signal from the flip-flop circuit 41 as inputted into one input of the NAND gate 49. This control signal appears in an inverted form due to the inverting action of the NAND gate 44. The third phase input signal C, inputted into the other input of the NAND gate 49, also appears in an inverted form due to the action of the inverter 14''.

The NAND logic gate 49 operates in a manner well known to those skilled in the art to produce a high level output signal for all combinations of high and low inputs along lines 48 and 38 except for coincident high input signals to lines 48 and 38. For such coincident high input signals, a low output signal is transmitted along line 50. Inspection of the two input signals to the gate 49 as shown in FIG. 3a, reveals that the high level input signals to the inputs of NAND gate 49 never coincide. A high level input signal occurs along line 48 between 300° and 360° while the high level input signal along line 38 appears between 60 and 240 electrical degrees. As such, there will never be a coincidence of high level input signals to both inputs of the NAND gate 49 when the phase sequence of the phase power signals is correct and consequently the comparing gate 49 will transmit a constant high level signal along line 50 for all the high and low signal variations to the comparing gate 49 when the predetermined phase sequence is maintained. It is thus seen that for the predetermined phase sequence between power signals A, B, and C, the phase sequence and power loss detector 10 will transmit a constant high level output signal along line 50.

Figure 4:
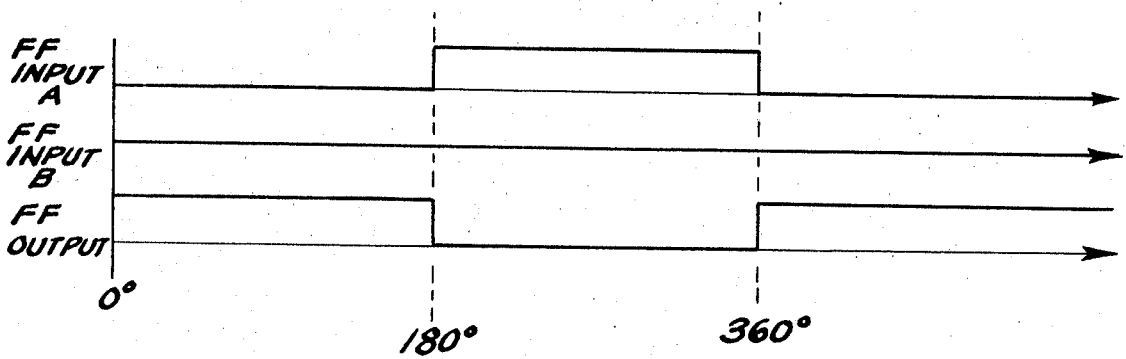
FIGS. 4 and 4a show the response of the phase sequence and power detector circuit to a loss of power in one of the predeterminately connected phase connections.
Figure 4A:
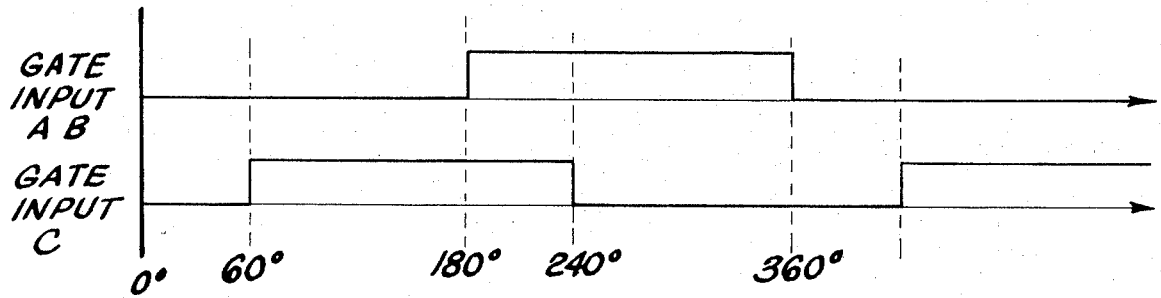

Referring now to FIG. 4 and 4a, when a power loss occurs in any of the individual phase signal connections, A, B, C, the signal transmitted by the comparing gate 49 along line 50 will change from a constant high level output signal, described with reference to FIGS. 3 and 3a, to a pulsating output signal. For example, when the second phase input signal B experiences a loss of power, a constant zero level input signal will be provided along line 36 to the input of the second NAND gate 26 of the flip-flop circuit 41. The first phase input signal A will remain in the form previously described with reference to FIG. 3. The flip-flop circuit 41 will respond to the first phase input signal A and the second phase input signal B to transmit a control output signal, as shown in FIG. 4 by FF OUTPUT, indicative of a loss of power in one of the phase signals. It will be noted that the output of the flip-flop circuit 41 now transmits a high level signal from 0 to 180 electrical degrees and a low level output signal from 180 to 360 electrical degrees. The control signal transmitted by the flip-flop circuit 41 along lines 46 is inverted by the NAND gate 44 and transmitted by line 48 to one input of the NAND gate 49, in the form indicated as GATE INPUT AB of FIG. 4a. The second input of the NAND gate 49 is provided by the third phase signal C transmitted along line 38. The third phase signal C remains in the same form indicated at FIG. 3a. Inspection of the two input signals directed to NAND gate 49, as shown in FIG. 4a, illustrates that the inputs to the NAND gate 49 will provide coincidental high signals between 180 and 240 electrical degrees to enable NAND gate 49 to establish a low output signal on line 50. For all other combinations of input signals, the NAND gate 49 will produce a high output signal. Thus, the constant level high output signal from the NAND gate 49 will change to a pulsating output signal having a low output between 180 and 240 electrical degrees whenever the power to the second phase signal B is terminated. Similarly, a loss of power in the other phase connections A or C will change the normally constant high level output signal transmitted by the NAND gate 49 to a pulsating output signal.

Figure 5:
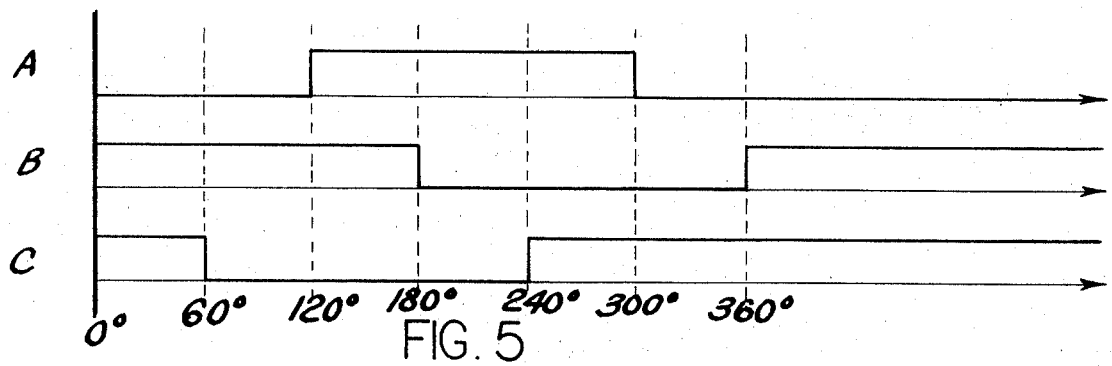
FIG. 5 shows the input signals A, B, and C with input signals A and B in reverse order from the predetermined sequence shown in FIG. 2.
Figure 6:
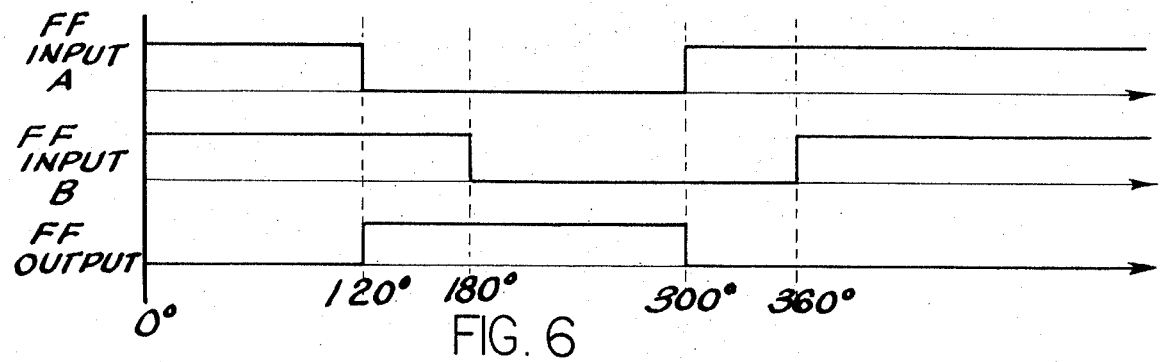
FIGS. 6 and 6a show the response of the phase sequence and power loss detector circuit to the phase signals A, B, and C connected in a non-predetermined phase relationship.
Figure 6A:
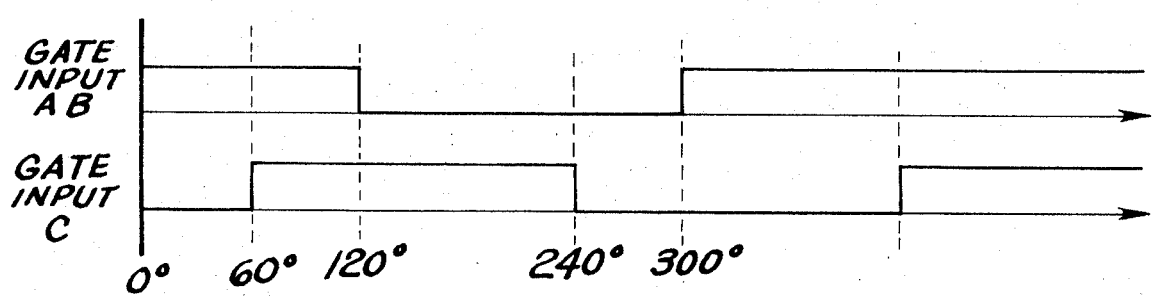

Should the predetermined phase order of the individual phase power signal connections be changed, the NAND gate 49 of the phase sequence and power loss detector 10 will similarly produce a pulsating output signal indicative of a non-predetermined phase sequence between the individual power signals A, B, C. Referring to FIG. 5, the first and second phase power signal A and B are shown reversed in sequence from the predetermined phase sequence described with reference to FIG. 2. The input to the first NAND gate 24 of the flip-flop circuit 41 is indicated by FF INPUT A at FIG. 6. The input to the second NAND gate 26 of the flip-flop circuit 41 input is indicated by FF INPUT B at FIG. 6. The flip-flop circuit 41 responds to the two, reverse connected, first phase and second phase power signals A and B to transmit a pulsating control output signal along line 46 as indicated by FF OUTPUT at FIG. 6. This pulsating control signal has a low output level between 0 and 120 electrical degrees and a high output level between 120 and 300 electrical degrees and a low output level between 300 and 360 electrical degrees. This pulsating control signal, indicative of a non-predetermined phase sequence between phase signal A and B, is inverted by the NAND gate 44 and transmitted along line 48 to one input of the NAND gate 49. This inverted signal from gate 44 is transmitted to one input of the gate 49 in the form indicated by GATE INPUT AB at FIG. 6a. The second input of the comparing gate 49 is transmitted along line 38 by the third phase input signal C, in the form indicated by GATE INPUT C of FIG. 6a. A review of the two input signals to the NAND gate 49, as exhibited at FIG. 6a, discloses that concurrent high level input signals will be provided to the inputs of NAND gate 49 between 60 and 120 electrical degrees. Thus, the output signal transmitted by the NAND gate 49 will be a pulsating signal having a low or zero level output signal between 60 and 120 electrical degrees and a high level output signal between 0 and 60 electrical degrees and between 120 and 360 electrical degrees. This signal is indicative of a non-predetermined phase sequence between signals A, B, and C. For any similar misconnection of the input signals A, B, and C which deviate from that of the predetermined phase sequence, the output of the NAND gate 49 will be a pulsating output signal.

To convert the pulsating signal transmitted by the NAND gate 49 to a constant level signal, a flip-flop circuit 52 is used. The flip-flop circuit 52 is connected to the phase sequence and power loss detector 10 by line 50 and to a capacitor 64 by line 51. The flip-flop circuit 52 is utilized to change the pulsating and high level output signals transmitted by the NAND gate 49 of the phase sequence and power loss detector 10 into distinct first and second constant level output signals. These first and second constant level output signals are more adaptable to normal indicating equipment, such as indicator lights or transistor switches, which may be connected to the flip-flop circuit 52 by line 62. However, the pulsating and high level output signals transmitted by the NAND gate 49 could also be directly coupled to indicating devices (not shown) which would provide a signal to indicate improper phase sequence or loss of power.

The flip-flop circuit 52 includes a first NAND gate 54 and a second NAND gate 56. One input of the first NAND gate 54 is connected to the output of the second NAND gate 56 by line 58 while one input of the second NAND gate 56 is connected to an output of the first NAND gate 54 by line 60. The capacitor 64 which is originally uncharged, is utilized to start the flip-flop circuit 52. When power is applied to any of the individual phase connections, a switch S is automatically closed, by means familiar to those skilled in the art, to apply the energy of 5 volt battery to the capacitor 64. Since the capacitor 64 does not charge instantaneously, the initial low output signal of the capacitor 64 sets the flip-flop circuit 52. The capacitor 64 is charged by current flowing along line 66 and when fully charged provides a high level output signal to the flip-flop 52 to assure a constant low output signal from the flip-flop 52 for pulsating inputs along line 50 to the flip-flop 52. The flip-flop circuit 52 acts in a manner that is well known to those skilled in the art to change the pulsating output signal from the NAND gate 49 to a constant low level output signal along line 62. When a constant high level output signal is transmitted to the flip-flop 52 along line 50 the flip-flop 52 remains unchanged and transmits a high signal along line 62. These distinct constant level output signals provide signals to an indicating device (not shown) indicative of proper or improper phase sequence connection as well as power to the individual phase connections. The constant high level output signal is indicative of predetermined phase sequence between the phase signals A, B, and C and power from each phase signal. The constant low level output signal is indicative of a loss of power to at least one phase signal or a non-predetermined phase sequence between the signals A, B, and C. The indicator (not shown) may be connected to the line 62 in a well known manner and includes any known indicating device such as an indicator light which would be turned on by the low level output signal and which would be shut off by the high level output signal. When the indicator is turned on to indicate a malfunction, the individual phase connections may be easily checked for power to check if individual phase power loss is the cause of the malfunction. If the test indicates the presence of power from all of the signals A, B, and C, it is then known that the signals A, B, and C are not in the predetermined phase sequence and they must be changed. Individual indicating lights (not shown) may be series connected with the individual phase power signal connections A, B, and C, which would be turned on as long as power is supplied along the individual phase connection line. These indicator lights could be utilized along with the indicator connected to the flip-flop circuit 52 to determine at a glance whether the malfunction is due to a lack of power in an individual phase connection or a non-predetermined sequence connection between the individual phase signals. The output signals of the flip-flop circuit 52 could also be used to trigger a control function in an auxiliary circuit if it is required. It is the Applicant's intention, that all such modifications and improvements be included within the scope of this disclosure and that it not be limited to the specific embodiment described.

What I claim as new and desire to secure by Letters Patent of the United States is:

1. A detector circuit for providing an indication of predetermined phase sequence between lines of a poly-phase cyclic power line and an indication of loss of power from at least one line of a properly sequenced poly-phase power line comprising:
   a first phase power signal line having a first predetermined phase signal;
   a second phase power signal line having a second predetermined phase signal;
   a third phase power signal line having a third predetermined phase signal;
   a first flip-flop circuit, first means connected from said flip-flop circuit to said first and second power lines, whereby said flip-flop circuit establishes a control signal upon detection of predetermined phase sequence between said first and said second signals; and
   second means including a logic gate connected to said first flip-flop circuit and said third power line, whereby said logic gate is responsive to said control signal from said first flip-flop circuit and said third signal from said third phase power line to establish a pulsating output signal whenever said control signal and said third signal have a phase sequence other than said predetermined phase sequence or whenever there is power loss in any of said power signal lines and to establish a first constant level output signal whenever said control signal and said third power signal have a predetermined phase sequence and each line of said poly-phase power line is powered.

2. A detector circuit as set forth in claim 1 including converting means connected to the output of said logic gate, to convert the pulsating signal of said logic gate into a second constant level output signal, distinct from said first constant level signal, capable of actuating an indicating device.

3. A detector circuit as set forth in claim 2 wherein said first flip-flop circuit has an output connected to an inverter included in said second means for inverting the output of said first flip-flop circuit.

4. A detector circuit as set forth in claim 3 wherein said logic gate is a NAND gate having inputs connected to said third phase power signal line and to an output of said inverter.

5. A detector circuit as set forth in claim 4 wherein said converting means includes a second flip-flop circuit having one input connected to an output of said NAND gate and another input connected to a capacitor, said capacitor acting to set said second flip-flop circuit.

6. A detector circuit as set forth in claim 5 wherein said first and second means includes:
   signal modifying means, connected to each of said phase signal lines, to modify said first, second and third phase power signals to logic compatible signals;
   a first, second, and third inverter respectively connected to each of said signal modifying means to produce a sharp leading edge to each of said phase signals; and
   a NAND gate connected between an output of said second inverter and a second phase signal input of said first flip-flop circuit.

7. A detector circuit as set forth in claim 6 wherein:

said first flip-flop circuit includes a first and a second NAND gate each having two inputs and one output, said inputs of said first NAND gate of said first flip-flop circuit being connected to said first inverter and to said output of said second NAND gate of said first flip-flop circuit, said inputs of said second NAND gate of said first flip-flop circuit being connected to an output of said second inverter connected NAND gate and to said output of said first NAND gate of said first flip-flop circuit.

8. A detector circuit for indicating a predetermined phase relationship between individual power lines of a poly-phase power line comprising:
   first, second, and third phase power lines transmitting predetermined phase signals;
   first flip-flop means means connected from said flip-flop means to said first and second phase power lines, whereby said phase signals from said first and said second phase power lines are combined to establish a first control signal indicative of predetermined phase relationship between said first and said second power line signals and a second control signal indicative of a non-predetermined phase relationship between said first and said second power line signals; and
   second means responsive to said phase signal from said third phase power line and said control signals from said first means for comparing said control signals and said third phase signal to establish a first output signal indicative of predetermined phase relationship between said phase signals of said first, second, and third phase power lines upon detecting said first control signal from said first means and said phase signal from said third power line.

9. A detector circuit as set forth in claim 8 wherein:

said second means includes a logic gate having one input responsive to said control signals established by said first means and another input connected to said third phase power line to establish a first constant level output signal when said phase signals transmitted by said first, second and third phase power lines of said poly-phase power line are transmitted according to said predetermined phase relationship and to establish an output signal other than said first constant level output signal when said phase signals are transmitted by said first, second and third phase power lines according to other than said predetermined phase relationship.

10. A detector circuit as set forth in claim 9 wherein said logic gate establishes a signal other than said first constant level output signal when there is a signal loss in at least one of said first, second and third phase power lines.

11. A detector circuit as set forth in claim 9 wherein said first means includes a flip-flop circuit having a first NAND gate with a first input connected to said first phase power line and a second NAND gate with a first input connected to said second phase power line, said first NAND gate having a second input connected to an output of said second NAND gate.

12. A detector circuit as set forth in claim 11 including converting means, connected to an output of said logic gate, for converting said first constant level output signal and said other than said first output signal into a distinct first and second constant level output signal capable of actuating an indicator.

13. A detector circuit as set forth in claim 12 wherein said converting means includes a second flip-flop circuit having a first input connected to the output of said logic gate and a second input connected to a capacitor, said capacitor providing an initially low level signal to set said second flip-flop circuit.

* * * * *